United States Patent [19]

Junginger et al.

[11] Patent Number: 4,960,087
[45] Date of Patent: Oct. 2, 1990

[54] DEVICE FOR SIGNALLING FAULTY CONDITIONS IN MOTOR VEHICLE

[75] Inventors: Erich Junginger, Stuttgart; Eberhard Schnaibel, Hemmingen; Erich Schneider, Kirchheim, all of Fed. Rep. of Germany

[73] Assignee: Robert Bosch GmbH, Stuttgart, Fed. Rep. of Germany

[21] Appl. No.: 371,420

[22] Filed: Jun. 26, 1989

Related U.S. Application Data

[63] Continuation-in-part of Ser. No. 144,620, Jan. 11, 1988, abandoned, which is a continuation of Ser. No. 838,557, Mar. 11, 1986, abandoned.

[30] Foreign Application Priority Data

Mar. 22, 1985 [DE] Fed. Rep. of Germany ........ 3510321

[51] Int. Cl.$^5$ .............................................. F02B 77/00
[52] U.S. Cl. .................. 123/198 D; 123/630; 123/339
[58] Field of Search ..................... 123/198 D, 630, 339

[56] References Cited

U.S. PATENT DOCUMENTS 4,292,939 10/1981 Coates et al. ....................... 123/630
4,441,471 4/1984 Kraft et al. .......................... 123/339
4,509,480 4/1985 Kull et al. ....................... 123/198 D Primary Examiner—Raymond A. Nelli
Attorney, Agent, or Firm—Michael J. Striker

[57] ABSTRACT

An electronic control system for an engine of a vehicle is provided with an idling RPM set-point regulator to deliver at its output a nominal idling speed control signal, and a summer for combining the control signal with a modulating error signal which is generated in response to a detection of a defect in a component part of the vehicle. The modulated nominal control signal causes a corresponding change in the normal running of the engine during idling operation or during reduced load thus signalling to the operator a faulty condition. Additional warning means are provided for generating optical warning signals, and means for generating the modulating error signal to be supplied to the electronic control system when a defect occurs in the warning means.

18 Claims, 3 Drawing Sheets 4,960,087

DEVICE FOR SIGNALLING FAULTY CONDITIONS IN MOTOR VEHICLE

CROSS-REFERENCE TO RELATED APPLICATIONS

This is a continuation-in-part of application Ser. No. 144,620 filed Jan. 11, 1988, now abandoned, which is a continuation of application Ser. No. 838,557, filed Mar. 11, 1986, now abandoned.

BACKGROUND OF THE INVENTION

The present invention relates in general to an alarm device and in particular to an alarm device for signalling defective conditions in a motor vehicle having an internal combustion engine equipped with an electronic fuel metering control system.

From German publication No. DE-OS 31 09 638 a monitoring device is known which monitors an electronically controlled gas pedal in a motor vehicle. The prior art device uses a program memory for identifying correct or false address words whereby the individual bits of such address words are derived from test potentials detected at components of the electronic gas pedal controlling arrangement. The output of the program memory is applied to a warning device in the form of a signal generator which in the case of the detection of at least one erroneous test potential becomes activated and signals to the operator of the vehicle the occurrence of a possible hazard. If a defect occurs in the warning device itself however the error and the resulting risky condition remain undetected.

It is also generally known, at the occurrence of a defect in the regulating system of an internal combustion engine, to automatically reset to a zero position the setting mechanism which controls fuel metering whereby the zero position corresponds to an adjustment for dosing smaller amounts of fuel. In this manner in the case of a fault an uncontrolled or excessive power output of the IC engine and the resulting hazard for the operator of the vehicle, are avoided. Due to the reduced fuel metering the vehicle can operate only in the emergency mode of operation at which the power output is considerably reduced and subsequently the utility of the vehicle is considerably limited.

SUMMARY OF THE INVENTION

It is therefore a general object of this invention to avoid the disadvantages of the prior art alarm devices of this kind.

In particular, it is an object of this invention to provide an improved warning device which in the event of an occurrence of a defect in the motor vehicle, particularly of a defect in working components of the engine control or in devices monitoring this control, reliably signals to the operator of the vehicle the defective condition in such a manner that the running of the internal combustion engine under certain operational conditions is changed to a simulated abnormal running so that the operator is prompted to see a workshop for removing the defect.

Another object of the invention is to provide the simulated abnormal running without limiting the utility of the motor vehicle.

In keeping with these objects and with others which will become apparent hereinafter, one feature of the invention resides in the provision of means for generating a modulating error signal when a defect condition occurs in the components of the engine or in a warning device for monitoring the engine control, the electronic fuel metering control system including means for regulating idling operation of the engine, means for producing a nominal idling control signal for the regulating means, and means for combining the nominal idling control signal with the modulating error signal such as to simulate an abnormal idle running of the engine signalling the defect condition.

The advantage of the alarm device of this invention acting through the simulated disturbance of the normal functioning of the engine is the certainty that the warning signal will not be overlooked by the operator. A further advantage of the alarm device of this invention resides in the possibility to select the simulated disturbance introduced in the engine in such a manner that the driving performance or the availability of the vehicle is not substantially impaired or limited. Hence the alarm or warning device of this invention is suitable particularly for signalling those defects which do not necessitate a limitation in the operativeness or usefulness of the vehicle.

In the preferred embodiment of this invention, there is also provided a known warning device which, apart from signalling engine defects also signals the defects which may occur in a vehicle part outside the engine and including means for generating the error signal when a defective condition occurs in the warning device itself.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
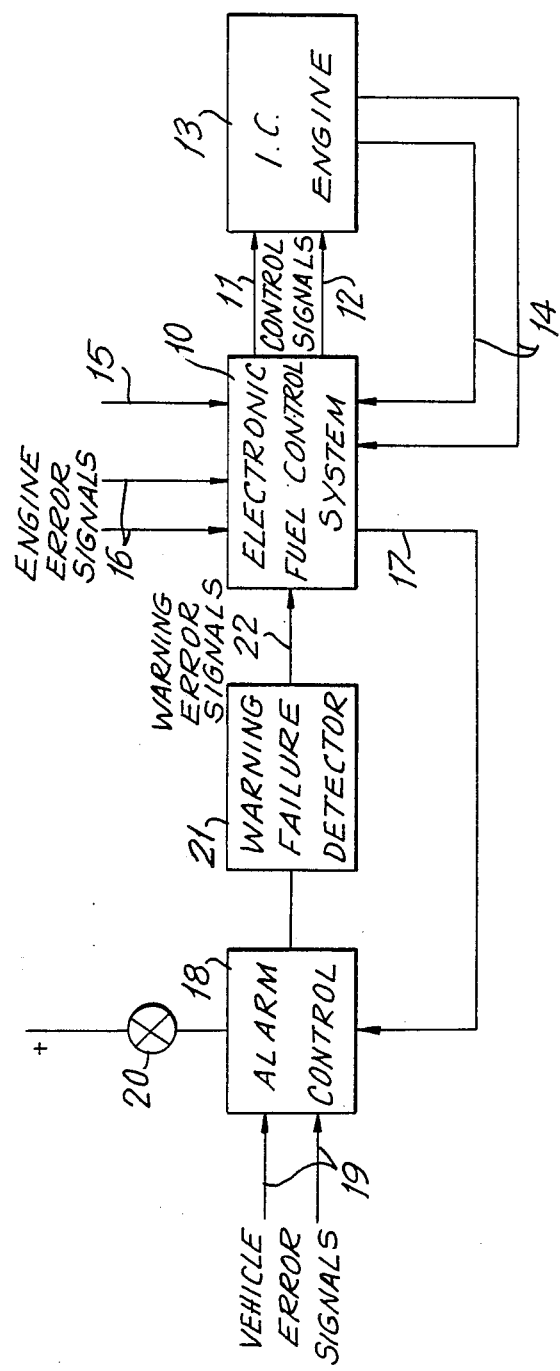
FIG. 1 illustrates in a simplified block circuit diagram an example of the alarm device of this invention.

An electronic control system 10 which controls at least fuel metering for an internal combustion engine 13 of a motor vehicle is connected to the engine via a plurality of connection paths 11 to 12 through which it delivers to the engine control signals in dependency on operational conditions of the vehicle. The control system also includes an idling RPM set-point control which is known from the U.S. Pat. No. 4,441,471 (assigned to the same assignee) the entire disclosure of which is incorporated herein by reference. Input 14 of the control system 10 receives data about actual operational variables of the engine such as temperature, rotary speed and the like. The connection path 12 serves preferably for delivering to the engine desired operational values outside the full load mode of operation of the engine, such as for example for the setting of idling speed. Through input 15 the control system 10 receives commands from the operator. The additional input 16 serves for applying to the idling RPM set-point control of the control system a first set of modulating error signals generated respectively in response to the detection of defective components in the circuit pertaining to the engine.

Figure 3:
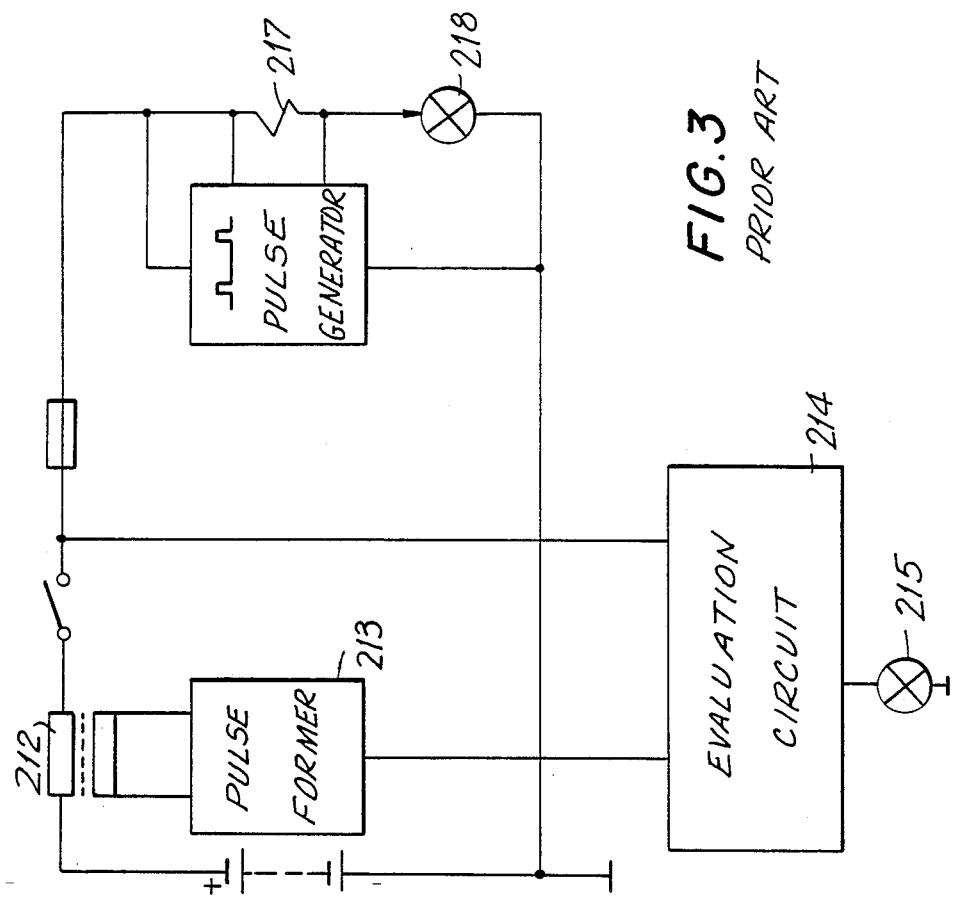
FIG. 3 shows a prior art device for the detection of a faulty condition in a warning device.

As an option, there is provided an output 17 through which in the event of the occurrence of an error signal at the input 16, an alarm signal is fed to an alarm signal control 18 which energizes a standard warning device 20, for example an incandescent lamp. The alarm signal control 18 is further provided with additional inputs 19 connected to a non-illustrated generator of a second set of error signals which occur when a defect is detected in a part of the motor vehicle outside the engine. If at least one of the inputs 19 is activated, current supply to warning unit 20 is switched on. Another output of the alarm signal control 18 is connected to an error evaluating unit 21 which is designed for detecting a defect in the warning unit 20 itself and delivers a pulsating error signal to input 22 of the idling RPM set point control in the electronic control system 10. An example of a prior art circuit for detecting a faulty condition in the warning device itself, described in the German patent publication DE-OS No. 3244250 (assigned to the same assignee), is illustrated in FIG. 3. When voltage drop across resistor 217 decreases due to a defect in the incandescent warning lamp 218, then pulse generator 211 starts generating random pulses.

Referring again to FIG. 1, if at least one of inputs 16 or 22 of the idling RPM set-point control of control system 10 receives an error signal then the desired value set by the idling RPM set-point control is modulated by the error signal and at the output 12 a control signal is generated which causes a conspicuous change in the idle running of the engine when the vehicle is not moving. Preferably, the change is introduced at predetermined time intervals or periodically by corresponding switch-overs of the duration of the pulsative error signal. In this manner the normal idling speed of the internal combustion engine is modulated to such an extent that the change cannot be overlooked. A timely and reliable signalling of a defective operational condition according to the invention is also possible when the vehicle is moving inasmuch as the idling mode of operation of the engine under normal traveling conditions of the vehicle recurres at sufficient short time intervals.

In the event that the warning device 20 becomes inoperative then the visual indication or error signals supplied to input 16 of the electronic control system 10 would no longer be possible. Similarly, the second set of error signals at inputs 19 which are normally indicated only by the warning device 20 would be unnoticed. In this case the error evaluating unit or warning failure detector 21, as described before, generates a modulating error signal which is supplied to input 22 of the control system 10 where, as soon as the engine 30 is outside its full load mode of operation, the abnormal running of the vehicle is simulated in the same manner as in the case of the error signals at inputs 16. However, when running under a full load condition the error signal has no effect and the engine delivers its full power output without any modulation of its running. Only outside the full load mode of operation of the vehicle, for example during idling, the operator experiences a discomfort due to the abnormal engine behavior and is motivated to have the defect removed in a service station.

Figure 2:
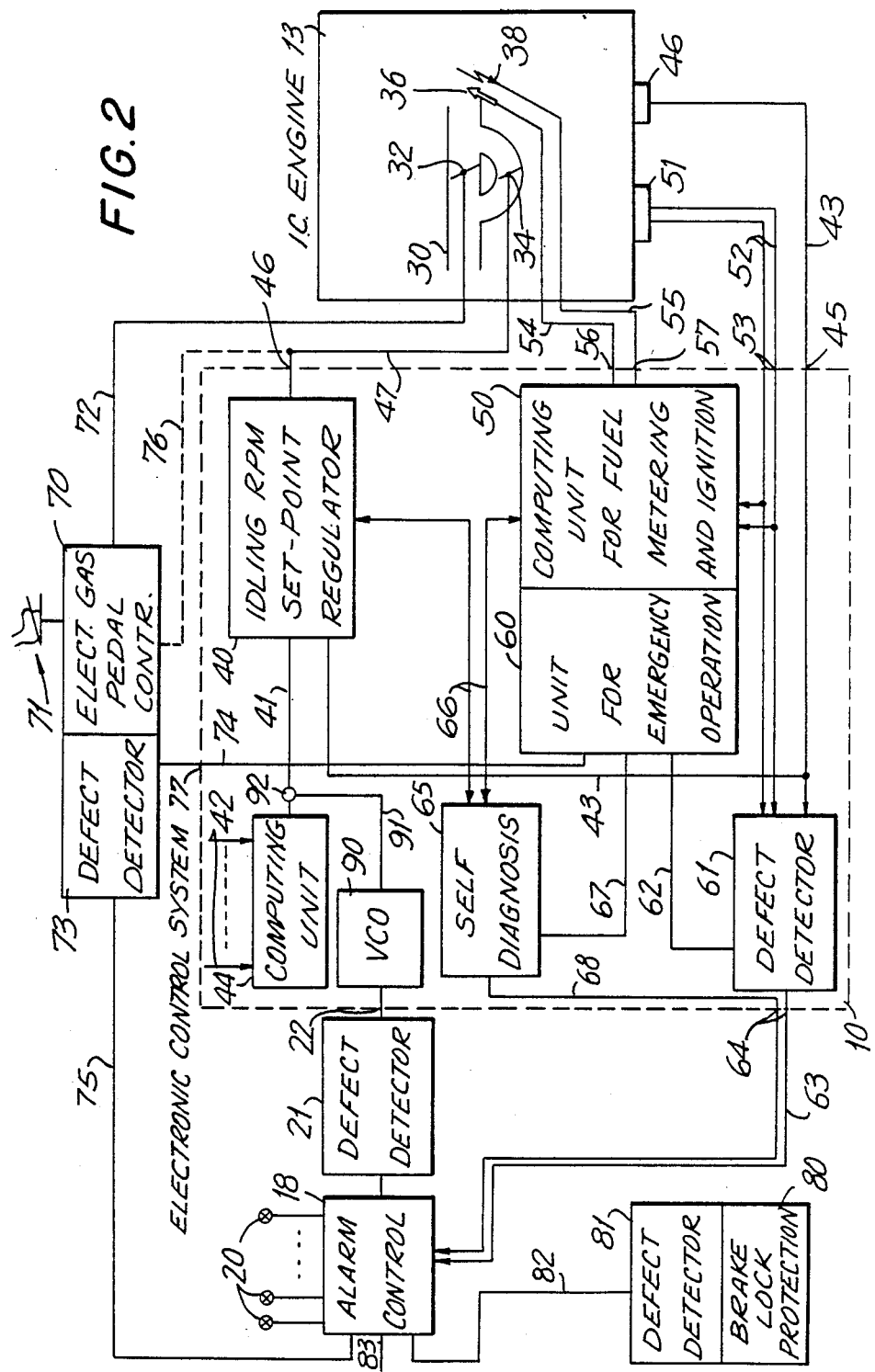
FIG. 2 shows a block circuit diagram of a more detailed embodiment of this invention.

The embodiment of the invention illustrated in FIG. 2 includes an internal combustion engine 13 having an air suction duct 30 provided with a throttle valve 32, and an electrically actuated bypass valve 34 arranged in a conduit bypassing the throttle valve. The engine further includes a device 36 for fuel metering and a device 38 for generating ignition sparks. The electronic control system 10 in this embodiment includes the idling speed (RPM) set-point regulator 40 (known from the U.S. Pat. No. 4,441,471) to which a nominal idling speed signal is applied via summer 92 and connection line 41. The nominal or desired idling speed signal is generated in a computing unit 44 in dependency on operational variables of the motor vehicle which are supplied to inputs 42. The operational variables include engine temperature, battery voltage, turning-on of an air-conditioner, gear setting, etc. The idling speed regulator 40 is also supplied via line 43 at input 45 with an actual engine speed signal delivered by a speed sensor 46 and, in dependency on the difference between the nominal and actual speed signals the regulator delivers at the output 46 the nominal idling speed signal which controls via line 47 the bypass valve 34 to regulate the idling RPM of the engine to the desired value.

A computing unit 50 determines on the basis of predetermined operational variables such as engine temperature, quantity of sucked-in air, exhaust gas composition, etc. the desired dose of fuel and the appropriate ignition time point.

Measuring signals from sensors 51, corresponding to the predetermined operational variables, are supplied to the computing unit 50 via lines 52 at inputs 53. The fuel metering device 36 and the ignition device 38 are controlled respectively, by control signals delivered at outputs 56 and 57 of the computing unit 50 and applied via lines 54 and 55. The computing unit 50 also cooperates with a unit 60 for introducing an emergency mode of operation of the vehicle, as it will be described later on.

A defect detecting unit 61 (known from the German patent publication DE-OS No. 3328450) tests the sensors 46 and 51 as to their functionability and if a failure or a defect is detected, it generates an error signal which activates via line 63 at output 64 and alarm control 18 a warning device 20, and/or via line 62 and unit 60 the emergency mode of operation.

A self-diagnosis unit 65 (known from the German publication DE-OS No. 3322240 or U.S. Pat. No. 4,414,949) is connected via bidirectional lines 66 to computing unit 50 and idling RPM set-point regulator 40 to test the functionality of these units. When a malfunction is detected, it generates an error signal which activates via line 68 at input 64 and the alarm control 18 a corresponding warning device 20, and/or activates via line 67 and unit 60 the emergency mode of operation of the vehicle.

If desired, the electronic control system 10 can be also equipped with an electronic gas pedal control 70 for controlling via line 72 the position of the throttle valve 32 in dependency on actuation of the gas pedal 71. The electronic gas pedal control 70 is also connected to a defect detector 73 which, after a defect in the control 70 has been recognized, generates an error signal and delivers the same via line 75 and alarm control 18 to a corresponding warning device 20, and/or via line 74 at input 77 to unit 60 for introducing the emergency mode of operation.

As an alternative to the influencing of the idling air supply by means of line 47 and the bypass valve 34, the electronic gas pedal control 70 can be connected via line 72 to the throttle valve 32. The electronic gas pedal control with a defect detector is known from the German publication DE-OS No. 3109638.

Another optional unit is a device 80 for protecting brakes against blocking. The device 80 is also equipped with a defect detecting unit 81 to generate an error signal when a failure is recognized. In this case, the error signal does not activate the emergency mode of operation and serves merely for activating via line 82 and alarm control 18 a corresponding warning device 20, as known from U.S. Pat. No. 4,493,210.

Input 83 of the alarm control 18 serves for receiving additional error signals which activate corresponding warning device 20. For example, the additional error signals result from an oil pressure switch, from a water-level gauge in a supply container of a window cleaning device, a detection of a defect in an exhaust gas regulator, or in the battery, etc.

The beforedescribed error signals supplied via lines 63, 68, 75, 82 and 85 activate individually or in combination with one another an assigned warning device 20 which can be in the form of an incandescent lamp. Similarly as in the embodiment of FIG. 1, the alarm control 18 is connected to a unit 21 for detecting a defect in the warning device 20 itself and generating a warning error signal after a defect has been recognized, as shown in FIG. 3. The warning defect detector 21 is connected at the input 22 to a function generator 90, for instance a voltage controlled oscillator VCO which is activated by the warning error signal to generate a modulating error signal variable in time. The modulating error signal is applied via line 91 to the summer 92 where it is combined with the nominal idling speed signal from the computing unit 44 and the modulated nominal signal controls via line 41 the idling speed set-point regulator 40 to introduce the modulation into the actual idle running of the engine as it has been described before in connection with FIG. 1. In other words, the desired or nominal value of the idling speed signal from the unit 44 is modulated or modified in response to the warning error signal to take an abnormal, periodically variable shape. In a preferred embodiment, the oscillator VCO modulates the nominal idling speed value at a frequency of 1 Hz per 100 RPM. The modulated idling speed control signal at the output 46 of the regulator 40 is applied via line 47 to the bypass valve 34 or via line 76, gas pedal control 70 and line 72 to the throttle valve 32, thus causing corresponding time variations in the actual idle running.

While the invention has been illustrated and described as embodied in connection with an electronic fuel metering control system for the engine, it is not intended to be limited to the details shown, since various modifications and structural changes may be made without departing in any way from the spirit of the present invention.

For example, this invention is generally applicable for indicating defects in all optical signalling devices in a motor vehicle, such as blinkers, hand brake actuation indicators, etc.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for signalling defect conditions in a motor vehicle having an internal combustion engine, a control system including means for regulating a nominal idling speed of the engine in dependency on predetermined operational variables, means for detecting malfunction of predetermined component parts of the motor vehicle, an optical warning device coupled with the detecting means to visually indicate a detected malfunction, comprising means for generating a modulating error signal when a defect occurs in said optical warning device, and said generating means being coupled to said idling speed regulating means to modulate the nominal idle running of the engine in response to said error signal such as to simulate an abnormal idle running of the engine signalling the defect condition.

2. A device as defined in claim 1, wherein said control system further includes means for controlling fuel metering, means for controlling ignition, means for controlling rate of air flow in an air suction duct, and means for controlling exhaust gas composition.

3. A device as defined in claim 2, wherein said malfunction detecting means monitor said exhaust gas controlling means, and said generating means delivering said modulating error signal in response to the detection of a defect in the exhaust gas controlling means.

4. A device as defined in claim 1, wherein said optical warning device includes optical indicators assigned, respectively, to different component parts of the vehicle, an electronic gas pedal control, a brake locking protection device, an oil pressure gauge, a power supply battery, blinkers and hand brake indicator, to indicate actuation and/or operative condition of said component parts.

5. A device as defined in claim 1, wherein said generating means deliver said modulating error signal at discrete time intervals.

6. A device as defined in claim 1, wherein said malfunction detecting means monitor the control system, and said generating means delivering said modulating error signal in response to the detection of a defect of the control system.

7. A device as defined in claim 1, wherein the motor vehicle includes means for measuring the predetermined operational variables, said malfunction detecting means monitoring said measuring means, and said generating means delivering said modulating error signal in response to the detection of a defect in the measuring means.

8. A device as defined in claim 4, wherein said malfunction detecting means monitor said electronic gas pedal control, and said generating means delivering said modulating error signal in response to the detection of a defect in the electronic gas pedal control.

9. A device as defined in claim 4, wherein said malfunction detecting means monitor said brake locking protection device, and said generating means delivering said modulating error signal in response to the detection of a defect in the brake locking protection device.

10. A device for signalling defect conditions in a motor vehicle having an internal combustion engine provided with an electronic control system affecting at least fuel metering of the engine, and including means for generating at least a control signal for regulating nominal idle running of the engine, comprising means for generating a modulating error signal when a defect condition occurs in the vehicle; and means for modulating said control signal by said modulating error signal such as to simulate an abnormal idle running of the engine signalling the defect condition.

11. A device for signalling defect conditions in a motor vehicle having an internal combustion engine and an electronic control system including means for controlling at least the fuel metering of the engine, means for regulating idle running of the engine and means for delivering a nominal idling control signal for said regulating means, comprising means for generating an error signal when a defect condition occurs in the vehicle; and means for modulating said nominal idling control signal in response to said error signal such as to simulate an abnormal idle running of the engine signalling the defect condition.

12. A device as defined in claim 11, wherein said error signal generating means includes means for generating an engine error signal when a defect condition occurs in the engine.

13. A device as defined in claim 12, where said error signal generating means further includes means for generating a vehicle error signal when a defect condition occurs in parts of the vehicle outside said engine; and further comprising an alarm control unit having an input connected to said vehicle error signal generating means and an output connected to a warning device to activate said warning device in response to said vehicle error signal; means for generating a warning error signal when a defect condition occurs in said warning device itself; and said modulating means modulating said nominal idling control signal in response to said warning error signal.

14. A device as defined in claim 13, wherein said electronic control system further includes self-diagnosing means for generating an additional vehicle error signal applied to said alarm control unit when a defect condition occurs in the electronic control system itself.

15. A device as defined in claim 13, wherein said motor vehicle includes an electronic gas pedal control, and said vehicle error signal being generated in response to a defect in said electronic gas pedal control.

16. A device as defined in claim 11, wherein said modulating means modulate the idle running of the engine at predetermined time intervals.

17. A device as defined in claim 11, wherein said electronic control system is designed for modulating the idle running of the engine periodically.

18. A device as defined in claim 11, wherein different error signals affect the modulation of the nominal idling control signal such as to change the simulated idle running of the engine in different ways.

* * * * *